United States Patent [19]

Oouchi et al.

[11] Patent Number: 4,748,830
[45] Date of Patent: Jun. 7, 1988

[54] AIR-COOLED ABSORPTION HEATING AND COOLING SYSTEM

[75] Inventors: Tomihisa Oouchi, Yatabe; Kyoji Kohno, Chiyoda; Yoshifumi Kunugi, Chiyoda; Kenzi Machizawa, Chiyoda, all of Japan

[73] Assignee: Hitachi, Ltd., Tokyo, Japan

[21] Appl. No.: 17,559

[22] Filed: Feb. 24, 1987

[30] Foreign Application Priority Data

Feb. 28, 1986 [JP] Japan ............................. 61-41781
Mar. 19, 1986 [JP] Japan ............................. 61-59182

[51] Int. Cl.⁴ ............................................ F25B 15/00
[52] U.S. Cl. ........................................ 62/476; 62/494
[58] Field of Search ............................. 62/494, 476

[56] References Cited

U.S. PATENT DOCUMENTS

| | | | |
|---|---|---|---|
| 2,287,441 | 6/1942 | McGinnis | 62/494 X |
| 3,742,728 | 7/1973 | Mamiya | 62/476 |
| 3,817,050 | 6/1974 | Alexander et al. | 62/476 X |
| 3,831,397 | 8/1974 | Mamiya | 62/476 |
| 4,467,623 | 8/1984 | Reimann | 62/494 |
| 4,551,991 | 11/1985 | Miyoshi et al. | 62/476 |
| 4,655,053 | 4/1987 | Kunugi et al. | 62/494 X |

Primary Examiner—Lloyd L. King
Attorney, Agent, or Firm—Antonelli, Terry & Wands

[57] ABSTRACT

First path flow passage is formed so as to lead the absorbent solution in the heat exchanger (7; 107) or the receive pan (24; 118a) disposed below a first path absorption process into a cooling air upper stream side of the first path absorption process through a conduit (30). Subsequent path flow passage is formed so as to lead the absorbent solution in the receive pan (24; 120) disposed below a subsequent path absorption process into the cooling air upper stream side of same path absorption process. The absorbent solution flow amount of each vertical tubes group (10; 158) can be obtained larger irrespective of the absorbent solution circulation flow amount for the refrigeration cycle. The dry portions of the vertical tube (10; 158) caused due to the storage of the absorbent solution circulation flow amount can be prevented.

19 Claims, 8 Drawing Sheets

AIR-COOLED ABSORPTION HEATING AND COOLING SYSTEM

BACKGROUND OF THE INVENTION

The present invention relates to an air-cooled absorption heating and cooling system and, more particularly, to an air-cooled absorption heating and cooling system used in building air-conditioning heat and cool source equipment.

The present invention relates to an air-cooled absorption heating and cooling system employing plural path absorption processes which have an air-cooled absorber and an air-cooled condenser. An absorbent solution has a counter-flow relationship with the cooling air. The absorbent solution and the refrigerant vapor have a cross-flow relationship with the cooling air.

A conventional air-cooled absorption refrigeration system is proposed in, for example, U.S. Pat. No. 4,467,623. The absorption refrigeration system described above mainly includes a generator, an air-cooled absorber having one path absorption process comprising only one group of a plurality of the vertical tubes, and an evaporator.

The vertical tube group provides absorbent solution storage members on the top thereof. The absorbent solution storage members are partitioned in plural storage chambers with particular members. A dense absorbent solution or strong solution is supllied into the plural storage chambers through absorbent solution conduits from the side portions of the storage chambers and stored in the storage chambers. The strong solution supplied to the generator is led to the top portion of the vertical tube group, so that the strong solution flows down into the vertical tube group. The refrigerant vapor generated in the evaporator is supplied into the bottom portions of the vertical tube group, so that the refrigerant vapor is absorbed with the absorbent solution, which flows down into the vertical tube group, then a diluted absorbent solution containing a large quantity of the refrigerant, which is a weak solution, is generated in this absorption refrigeration system.

Absorption heat, which is generated in the diluted absorbent solution generation process, is taken away by the cooling air, which passes over the outside surface of the vertical tube group, through the vertical tube walls and the fins thereof.

However, in this absorption refrigeration system having one path absorption process, there is no consideration taken about the absorption process having plural path absorption processes or the multi-path absorption processes. Therefore, in the air-cooled absorption refrigeration system utilizing the ambient atmosphere for cooling the air-cooled absorber, the absorbent solution is not cooled fully during the absorption solution flow-down absorption process into the vertical tube group.

It is difficult to make the concentration level of the absorbent solution and the temperature level of the absorbent solution, which are respectively necessary to perform the absorption refrigeration cycle.

Another known water-cooled absorption refrigeration system employing a water-cooled absorber is proposed. In this system, the absorption process carried out repeatedly in plural paths or in multi-stages, and the absorbent solution flow-down distance is lengthen.

However, in this water-cooled absorption refrigeration system, there is no consideration taken about the absorbent solution circulation flow amount in each path absorption prpcess with correspond to the cooling air amount in each path absorption process. Because of a series absorbent solution flow construction in the water-cooled absorber, the absorbent solution circulation flow amount in each path absorption process is substantially equal to be the absorbent solution inflow amount in the water-cooled absorber. Only the refrigerant vapor amount, which is absorbed in the water-cooled absorber, increases therein.

With so little absorbent solution circulation flow amount, it is necessary to increase the path number of the absorption process or to lengthen the substantial absorbent solution flow-down distance for generation of the concentration level and the temperature level of the absorbent solution, which are necessary to perform the absorption refrigeration cycle. However, even if this water-cooled multi-paths type absorber may apply to the air-cooled type absorber, it is difficult to put the system to practical use.

In the conventional air-cooled absorption refrigeration system, an absorbent solution circulation flow amount in the absorption process has a tendency to be insufficient in comparison with the cooling capacity of the cooling air. The absorbent solution circulation flow amount in the absorption process is not suited to comply; with the cooling capacity of the cooling air. The absorbent solution is not generated having a level of the most diluted concentration, which can perform in accordance with the cooling capacity of the cooling air passing the air-cooled absorber.

In case of the air-cooled absorption heating and cooling system, the air-cooled condenser and the air-cooled absorber have, respectively a large heating area, so that hot insulation in this system becomes impossible. Even if the compulsory ventilation is stopped during stoppage of the cooling fan, heat dissipation into the ambient atmosphere may occur due to the natural convection effect phenomenon.

Accordingly, a considerable amount of heat energy, which is introduced in the high temperature stage regenerator, is discharged into the ambient atmosphere through heat release phenomenon. Therefore, heat energy in the high temperature stage regenerator is not used effectively for heating the hot water during a heating mode operation of this system.

SUMMARY OF THE INVENTION

An object of the present invention is to provide an air-cooled absorption heating and cooling system wherein a few absorption process paths can be put therein to practical use.

Another object of the present invention is to provide an air-cooled absorption heating and cooling system wherein an absorbent solution circulation flow amount under the absorption process can be obtained larger than the absorbent solution circulation flow amount, which flows into the air-cooled absorber from the regenerator.

A further object of the present invention is to provide an air-cooled absorption heating and cooling system wherein an absorbent solution circulation flow amount for each path absorption process can be the flow amount in accordance with the cooling capacity of the cooling air.

Still another object of the present invention is to provide an air-cooled absorption heating and cooling system wherein the dry portion of the vertical tube caused by the shortage of the absorbent solution circulation flow amount can be prevented.

A still further object of the present invention is to provide an air-cooled absorption heating and cooling system wherein high heat transfer characteristics in this system can be attained.

Yet another object of the present invention is to provide an air-cooled absorption heating and cooling system wherein, during heating mode of operation, heat dissipation to the ambient atmosphere from the air-cooled absorber and the air-cooled condenser can be prevented therein.

In the air-cooled absorption heating and cooling system of the present invention, the air-cooled absorption heating and cooling system comprises a regenerator means for boiling absorbent solution to condense the absorbent solution, an air-cooled condenser means for condensing refrigerant vapor generated in the regenerator means, an evaporator means for evaporating refrigerant condensed in the air-cooled condenser means to provide cooling, an air-cooled absorber means for absorbing refrigerant vapor in the evaporator means into the absorbent solution concentrated in the regenerator means, and a heat exchanger means for heat absorbing heat exchange refrigerant vapor generated in the regenerator means.

The air-cooled absorber means includes a plurality of substantially vertical tubes groups, plural absorbent solution receive means for receiving the absorbent solution, which is disposed below each vertical tube group along the cooling air flow direction, and an absorbent solution supply means for supplying the absorbent solution in the absorbent solution receiving means into the vertical tube group. Plural path absorption processes are formed with the vertical tube group and the absorbent solution receiving means.

A passage for flowing absorbent solution is formed so as to lead absorbent solution in at least one of the heat exchanger means and the absorbent solution receiving means from the cooling air down stream side of an absorption process to the cooling air upper stream side of same path absorption process.

A first path absorbent solution flow passage is formed so as to lead the absorbent solution in at least one of the heat exchanger means and the absorbent solution receiving means disposed below a first path absorption process into the cooling air upper stream side of the first path absorption process through a dense absorbent solution conduit.

A subsequent path absorbent solution flow passage may be formed so as to lead the absorbent solution in the absorbent solution receiving means disposed below a subsequent path absorption process into the cooling air upper stream side of the same path absorption process.

Each subsequent path absorbent solution flow passage is formed so as to lead the absorbent solution in the absorbent solution receiving means disposed below each subsequent path absorption process into the cooling air upper stream side of same path absorption process.

The absorbent solution receiving means comprises plural receiving pan members being disposed at the down stream side of each path absorption process, and the absorbent solution in each receiving pan members is sprayed respectively into the same path absorption process.

The absorbent solution receiving means comprises plural receiving pan members being disposed at the down stream side of each path absorption process, and the absorbent solution in each receiving pan members is sprayed respectively into a subsequent path absorption process. The absorbent solution in each receiving pan members may be sprayed respectively into a next path absorption process.

In the air-cooled absorption heating and cooling system of the present invention, the absorption process having a path number such as from the second to about the sixth path can be adopted.

According to the present invention, the absorbent solution circulation flow amount, which flows down into each vertical tube group, can be obtained larger irrespective of the absorbent solution circulation flow amount for the refrigeration cycle. The dry portions of the vertical tube of the air-cooled absorber caused by the shortage of the absorbent solution circulation flow amount can be prevented, and high heat transfer characteristics can be attained therein.

Furthermore, in the present invention, plural valves are provided in the system. The first valve means is provided on a refrigerant conduit disposed between the high temperature stage refrigerator means and the air-cooled condenser means. The second valve means is provided on a steam conduit disposed between the evaporator means and an upper portion of the air-cooled absorber means. The third valve means is provided on a steam conduit disposed between the evaporator means and a lower portion of the air-cooled absorber means.

The fourth valve means is provided on a liquid refrigerant conduit disposed the air-cooled condenser means and the evaporator means. The fifth valve means is provided on an absorbent solution introduction conduit disposed between the high temperature stage regenerator means and the air-cooled absorber means. The sixth valve means is provided on a refrigerant conduit disposed between the high temperature stage regenerator means and the air-cooled absorber means. The seventh valve means is provided on a liquid refrigerant supply conduit disposed between the evaporator means and the high temperature stage regenerator means.

In addition to the above valves means, the liquid refrigerant pump means for sending the liquid refrigerant is disposed on the liquid refrigerant supply conduit disposed between the evaporator means and the high temperature stage regenerator means.

According to the present invention, during the heating operation, generation of the refrigerant vapor in the low temperature stage regenerator is stopped, and the refrigerant vapor is prevented from flowing into the air-cooled condenser.

Furthermore, according to the present invention, such valve means are provided on the steam passage communicating between the evaporator and the air-cooled absorber, and when the plural valve means are closed, the refrigerant vapor is prevented from flowing into the air-cooled absorber.

DETAILED DESCRIPTION OF THE PREFERRED EMBODIMENTS

Figure 1:
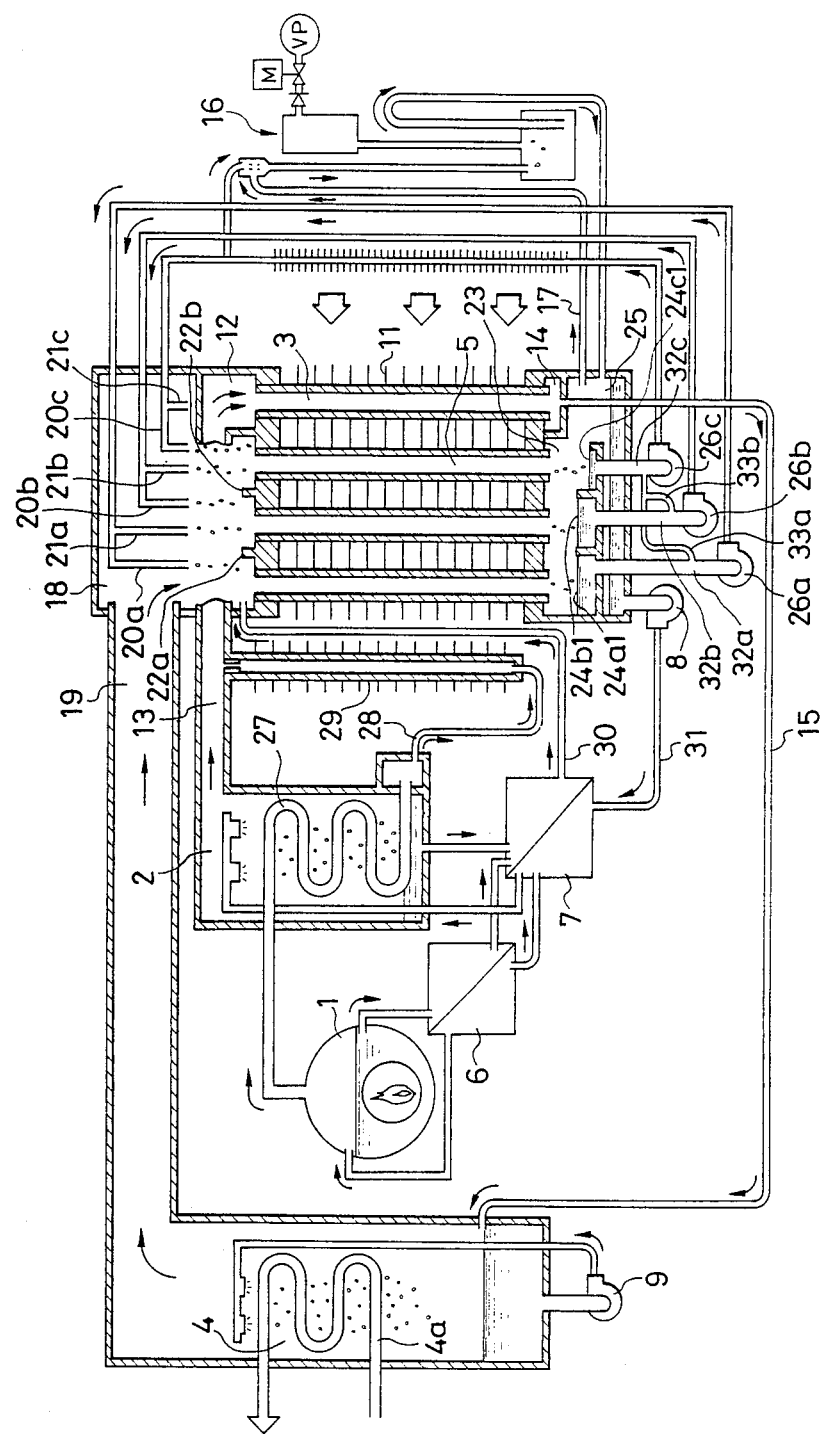
FIG. 1 is a schematic flow diagram, partially in cross section, of an air-cooled absorption heating and cooling system showing one embodiment of the present invention.
Figure 2:
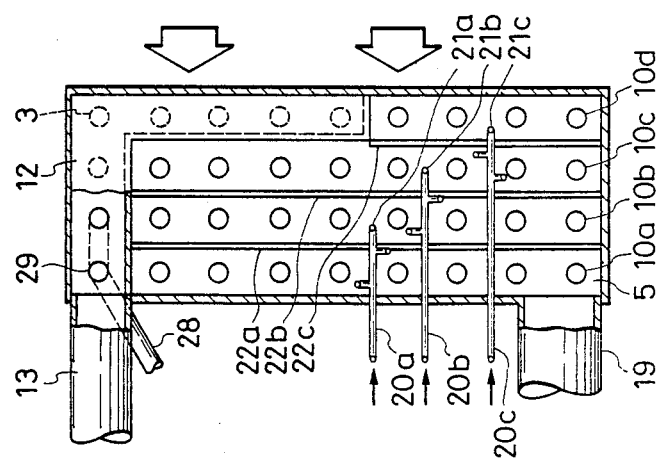
FIG. 2 is a cross-sectional view surrounding an air-cooled absorber and an air-cooled condenser shown in FIG. 1.

Hereinafter, one embodiment of the present invention will now be described with reference to FIGS. 1 and 2. An air-cooled absorption heating and cooling system includes a high temperature stage regenerator 1, a low temperature stage regenerator 2, an air-cooled condenser 3, an evaporator 4, an air-cooled vertical tube absorber 5, a high temperature stage heat exchanger 6, a low temperature stage heat exchanger 7, an absorbent solution circulation pump 8, and a liquid refrigerant spray pump 9.

The regenerators 1 and 2 boil the absorbent solution to condensate the absorbent solution. The air-cooled condenser 3 condenses the refrigerant vapor generated in the high temperature stage regenerator 1 and the low temperature stage regenerator 2. The evaporator 4 evaporates refrigerant, which is condensed in the air-cooled condenser 3, to provide cooling.

The air-cooled absorber 5 absorb the refrigerant vapor in the evaporator 4 into the absorbent solution, which is concentrated in the high temperature stage regenerator 1, and the low temperature stage regenerator 2. The high temperature stage heat exchanger 6 and the low temperature stage heat exchanger 7 heat-absorbs with heat exchange the refrigerant vapor generated in the high temperature stage regenerator 1 and the low temperature stage regenerator 2. The absorbent solution has a counter-flow relationship with the cooling air. The absorbent solution and the refrigerant vapor have, respectively, a cross-flow relationship with the cooling air.

The air-cooled absorber 5 comprises four lines of air-cooled heat exchangers, that is, four lines of vertical tube groups 10. A first, a second, a third, and a fourth line of vertical tube group 10a, 10b, 10c and 10d are arranged substantially parallel and have air cooling fins 11 provided orthogonally at outside surfaces thereof. In the most rear air-cooled heat exchanger line positioned at the cooling air inlet side, or in the fourth vertical tube group 10d, an upper header 12 and a bottom header 14 are provided therein. As shown in FIG. 2, the air-cooled condenser 3 is constituted in the partial portion of the most rear air-cooled heat exchanger line comprising the part portion of the fourth vertical tube group 10d.

The upper header 12 of the air-cooled condenser 3 communicates with the vapor phase portion of the low temperature stage regenerator 2 through a steam conduit 13. The bottom header 14 of the air-cooled condenser 3 communicates with the evaporator 4 through a liquid refrigerant conduit 15 and also communicates with an air extraction conduit 17 of an automatic air extraction apparatus 16.

Each line of the first, the second, the third, and the fourth of the vertical tube group 10a, 10b, 10c and 10d forms one absorption process path, respectively. Accordingly, each line of the vertical tubes group 10a, 10b, 10c and 10d constructs a first path, a second path, a third path, and a fourth path, respectively. The part portion of the fourth vertical tube group 10d performs the fourth absorption process path.

An upper header 18 of the air-cooled absorber 5 communicates with the vapor phase portion of the evaporator 4 through a steam passage 19. Each absorption process path is provided respectively with an absorbent solution spray apparatus at the upper portion thereof. The absorbent solution spray apparatus includes an absorbent solution spray pump 26a, 26b and 26c, and an absorbent solution spray conduit 20a, 20b and 20c connected respectively to the outlet of the absorbent solution spray pump 26a, 26b and 26c and a branch conduit 21a, 21b and 21c. Each absorbent solution spray conduit 20a, 20b, 20c and 20d communicates respectively with conduit 21a, 21b and 21c.

By the adoption of the absorbent solution spray method, the absorbent solution including the strong solution and the weak solution is uniformly supplied from the vertical upper portion direction all over the vertical tube group 10a, 10b, 10c and 10d.

Three partition plate members 22a, 22b and 22c are provided with the tube plate members, which are connected to the vertical tube group 10a, 10b and 10c, respectively. Each partition plate member 22a, 22b and 22c prevents the absorbent solution, which is the space between adjacent absorption processes, from mixing and makes uniform the distribution of the absorbent solution in the vertical tubes group 10a, 10b, 10c and 10d.

Three receiving pan members 24a1, 24b1 and 24c1 of each absorption process path and a diluted absorbent solution tank 25 are provided on the bottom header 23 of the air-cooled absorber 5. Each receiving pan members 24a1, 24b1 and 24c1 communicates respectively with the absorbent solution spray pump 26a, 26b and 26c.

In this embodiment of the present invention, the first path, the second path, and the third path are formed respectively with the vertical tube group 10a, 10b and 10c, and the receiving pan members 24a1, 24b1 and 24c1.

Each absorbent solution or weak solution in the receiving pan members 24a1, 24b1 and 24c1 is led respectively from the cooling air down stream side of the first path, the second path and the third path to the cooling air upper stream side of the same path and sprayed respectively into the first, the second and the third vertical tube group 10a, 10b and 10c through the absorbent solution spray conduit 20a, 20b and 20c by the absorbent solution spray pump 26a, 26b and 26c.

Each absorbent solution in the receiving pan members 24a1, 24b1 and 24c1 is led respectively into the second, the third, the fourth vertical tube group 10b, 10c and 10d and sprayed respectively into the second, the third and the fourth vertical tube group 10b, 10c and 10d through the branch conduit 21a, 21b and 21c by the absorbent solution spray pump 26a, 26b and 26c.

The absorbent solution of a lithium halide, such as lithium bromide (LiBr) solution, is evaporated and boiled with the heat of the combustion gas, which is supplied from a fuel burner in the high temperature stage regenerator 1. The absorbent solution is condensed with generation of the refrigerant vapor in the high temperature stage regenerator 1. The generated refrigerant vapor is led into a heat exchanger tube 27. The refrigerant vapor heats the absorbent solution, which is sprayed on the outside surface of the heat exchanger tube 27.

The refrigerant vapor is further condensed with generation of the refrigerant vapor and liquefied with condensation. The liquefied refrigerant is sent into the air-cooled condenser 3 through a liquid refrigerant conduit 28. The liquid refrigerant conduit 28 has an air-cooled heat exchanger tube 29, acting as an auxiliary air-cooled condenser, at the outlet portion thereof. The air-cooled heat exchanger tube 29 is cooled by the cooling air drawn by a fan, therefore heat load of the air-cooled condenser 3 can be eliminated.

The refrigerant vapor generated by the low temperature stage regenerator 2 is led into the upper header 12 of the air-cooled condenser 3 through the steam conduit 13. The refrigerant vapor is cooled in the heat exchanger tubes of the air-cooled condenser 3 with the cooling air and liquefied with condensation. The condensate is stored in the bottom header 14 and sent to the evaporator 4 from the bottom header 14 through the liquid refrigerant conduit 15.

The liquid refrigerant in the evaporator 4 is supplied into a heat exchanger tube 4a by means of the liquid refrigerant spray pump 9 and evaporated through heat exchange with the cooling water, which flows into the air-cooled heat exchanger tube 4a. The cooling water in the evaporator 4 is cooled and thereby necessary liquid refrigeration effect can be obtained. The refrigerant vapor, which is evaporated in the evaporator 4, is led into the upper header 18 of the air-cooled absorber 5 through the steam conduit 19.

The strong solution generated by the high temperature stage regenerator 1 flows into the top portion of the first absorption process path through the high temperature stage heat exchanger 6, the low temperature stage heat exchanger 7 and an absorbent solution conduit 30. The strong solution generated by the low temperature stage regenerator 2 flows into the top portion of the first absorption process path through the low temperature stage heat exchanger 7 and the absorbent solution conduit 30. Both strong solutions are supplied into the space between the header outside walls and the partition plate members 22a1 and absorb the refrigerant vapor in the first path.

Such a strong solution supply into the first absorption process path carries out the following, namely, the strong solution generated by the high temperature stage regenerator 1 flows into the receiving pan members 24a1 of the first absorption process path through the high temperature stage heat exchanger 6, the low temperature stage heat exchanger 7 and another absorbent solution conduit. The strong solution generated by the low temperature stage regenerator 2 flows into the receiving pan members 24a1 of the first path through the low temperature stage heat exchanger 7 and the other absorbent solution conduit. Both strong solutions are supplied into the space between the outside walls of the upper header 18 and the partition plate members 22a1 from the absorbent solution spray conduit 20a by means of the absorbent solution spray pump 26a.

The strong solution together with the refrigerant vapor in the receiving pan members 24a1 flows down into the first vertical tube group 10a through the absorbent solution spray conduit 21a, and are diluted through absorption of the refrigerant vapor in the first absorption process path, and thereafter returns into the receiving pan members 24a1. A part of the absorbent solution passing through the absorbent solution spray conduit 20a is separated and supplied into the second path, which is formed in the space between two adjacent partition plate members 22a and 22b, through the branch conduit 21a.

The comparatively strong solution in the low temperature stage heat exchanger 7 is led directly to the top portion of the first path through the absorbent solution conduit 30. The comparatively strong solution in the low temperature stage heat exchanger 7 is directly sprayed into the top portion of the first path without mixing with the absorbent solution, which is stored in any one of the receiving pan members 24a1, 24b1 and 24c1 and in the absorbent solution tank 25.

According to the above, the direct absorbent solution spray of the comparatively strong solution through the dense absorbent solution conduit 30 into the top portion of the first path results largely in a heat exchanger temperature difference between the first vertical tube group 10a and the comparatively strong solution supplied through the absorbent solution conduit 30.

The absorbent solution together with the refrigerant vapor in the receiving pan members 24b1 flows down into the second vertical tube group 10b and is diluted through the absorption of the refrigerant vapor and returns into the receiving pan members 24b1. The absorbent solution in the receiving pan members 24b1 is supplied into the space between two partition plate members 22a and 22b adjacent each other through the absorbent solution spray pump 26b and the absorbent solution spray conduit 20b, and absorbs the refrigerant vapor in the second path.

A part of the absorbent solution in the receiving pan members 24b1 of the second path is separated and supplied to the third path through the branch tube 21b.

The absorbent solution together with the refrigerant vapor in the receiving pan members 24c1 flows down into the third vertical tube group 10c and is diluted through the absorption of the refrigerant vapor and returns into the receiving pan members 24c1. The absorbent solution in the receiving receive pan members 24c1 is supplied into the space between two adjacent partition plate members 22b and 22c through the absorbent solution spray pump 26c and the absorbent solution spray conduit 20c, and absorbs the refrigerant vapor in the third path.

A part of the absorbent solution in the receiving pan members 24c1, which circulates the third path, is supplied into the fourth path through the branch conduit 21c.

The absorbent solution of the fourth path flows into the diluted absorbent solution tank 25 and further flows into the low temperature stage heat exchanger 7 through a diluted absorbent solution conduit 31 by means of the absorbent solution circulation pump 8.

A part of the absorbent solution in the low temperature stage heat exchanger 7 is sent into the low temperature stage regenerator 2, and the rest of the absorbent solution in the low temperature stage heat exchanger 7 is sent into the high temperature stage regenerator 1 through the high temperature stage heat exchanger 6.

Each receive pan members 24a1, 24b1 and 24c1 is communicated respectively with the communicating pipe 33a and 33b, which is provided respectively with the pump suction duct 32a, 32b and 32c, and thereby the absorbent solution spray pump 26a and 26b can be prevented from the racing.

According to the above stated embodiment of the present invention, by means of the absorbent solution spray apparatus, the absorbent solution in the absorbent solution receiving pan members 24a1, 24b1 and 24c1 positioned under each absorption process path is sprayed over the first, the second, the third vertical tube groups 10a, 10b and 10c, which are positioned respectively at the upper portion of the absorbent solution receiving pan members 24a1, 24b1 and 24c1. The absorbent solution circulation flow amount under each absorption process path is made larger than the absorbent solution circulation flow amount which flows from the low temperature stage regenerator 2 into the air-cooled absorber 5. The absorbent solution circulation flow amount for each absorption process path can be made equal to the circulation flow amount in accordance with the cooling capacity of the cooling air.

The absorbent solution can be generated as one having a level of nearly the most diluted concentration, which will be obtained under the condition according to the cooling capacity of the passing cooling air. The diluted absorbent solution is led in turn into each absorption process path, which is positioned nearby at the upper stream side, and carried out the absorption operation over the four path absorption processes. With such a four path absorption processes the diluted absorbent solution in the system can be obtained to have a concentration level necessary for formation of the absorption refrigeration cycle.

According to the above described embodiment of the present invention, the absorbent solution circulation flow amount, which flows down into each vertical tube group 10a, 10b and 10c can be larger irrespective of the absorbent solution circulation amount for the refrigeration cycle. Accordingly, the dry portions of the vertical tube of the air-cooled absorber 5 caused due to the shortage of the absorbent solution circulation flow amount can be prevented, and high heat transfer characteristics can be obtained therein.

Figure 3:
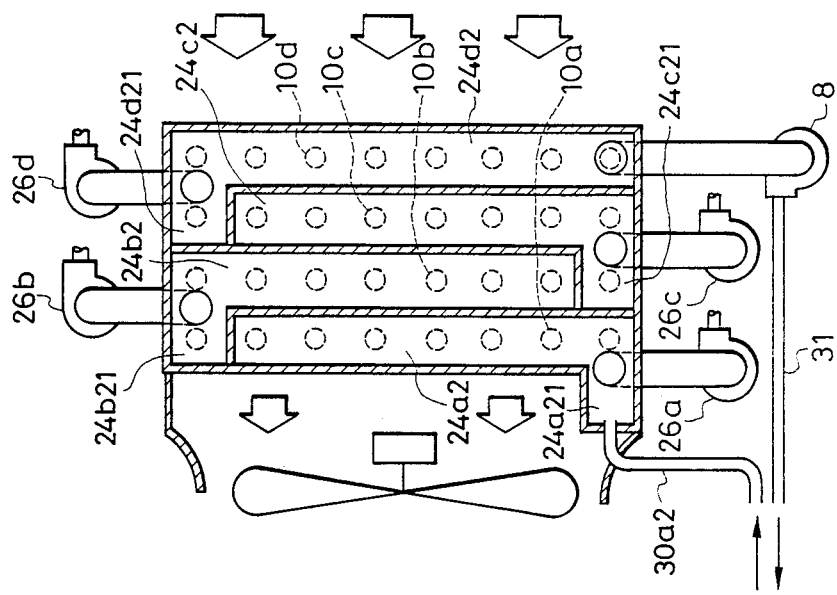
FIG. 3 is a schematic diagram surrounding an air-cooled absorber and an air-cooled condenser showing another embodiment of the present invention in which the partial portion of receiving pan members is extended to the preceding absorption process.

FIG. 3 shows another embodiment of the present invention. The partial portion 24a21, 24b21, 24c21 and 24d21 of the receiving pan members 24a2, 24b2, 24c2 and 24d2 of the first path, the second path, the third path and the fourth path are provided respectively on the bottom header 23 and extended toward the lower portion of the first, the second, and third vertical tube group 10a, 10b and 10c of the preceding path.

In this embodiment, the separation flow of the absorbent solution from one path to the next path carries out the following method. The comparatively strong solution for the first absorption process path is led into the receiving pan members 24a2 from the low temperature stage heat exchanger 7 through an absorbent solution conduit 30a2.

The comparatively strong solution in the receiving pan members 24a2 of the first absorption process path is led into the receiving pan members 24b2 of the second path through the partial portion 24a21. The comparatively strong solution in the receiving pan members 24b2 of the second absorption process path is led into the receiving pan members 24c2 of the third path through the partial portion 24b21. The comparatively strong solution in the receiving pan members 24c2 of the third absorption process path is led into the receiving pan members 24d2 of the fourth path through the partial portion 24d21. According to this embodiment of the present invention, the manufacture of the receiving pan members 24a2, 24b2, 24c2 and 24d2 is easier.

Figure 4:
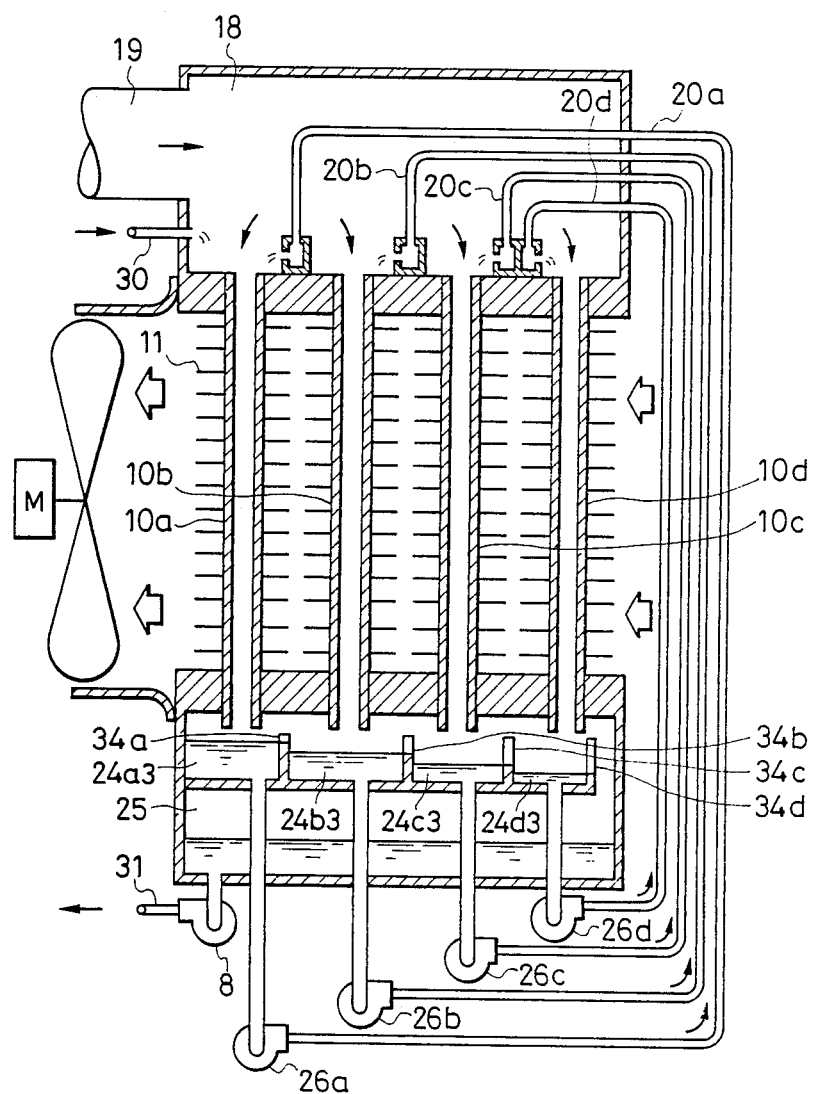
FIG. 4 is a schematic diagram surrounding an air-cooled absorber and an air-cooled condenser showing a further another embodiment of the present invention in which the receiving pan members are provided with dam members.

FIG. 4 shows another embodiment of the present invention. Each receiving pan members 24a3, 24b3, 24c3 and 24d3 is provided respectively with a dam members 34a, 34b, 34c and 34d of the first path, the second path, the third path and the fourth absorption process path on the down stream side wall thereof.

In this embodiment, the separation flow of the absorbent solution from one absorption process path to the next absorption process path is carried out as follows. The separation flow of the absorbent solution is carried out in turn, namely the absorbent solution of the receiving pan members 24a3 overflows into the receive pan members 24b3, 24c3 and 24d3 in turn and the diluted absorbent solution tank 25 getting over the dam members 34a, 34b, 34c and 34d in turn. The absorbent solution of the receiving pan members 24b3 overflows into the receive pan members 24c3 and 24d3 in turn and the diluted absorbent solution tank 25 getting over the dam members 34b, 34c and 34d in turn. The absorbent solution of the receiving pan members 24c3 overflows into the receive pan members 24d3 and the diluted absorbent solution tank 25 getting over the dam members 34c and 34d in turn.

According to this embodiment of the present invention, the liquid level of each receiving pan members 24a3, 24b3, 24c3 and 24d3 is maintained at all times at a predetermined value and thereby racing of the absorbent solution spray pump 26a3, 26b3, 26c3 and 26d3 can be prevented.

Figure 5:
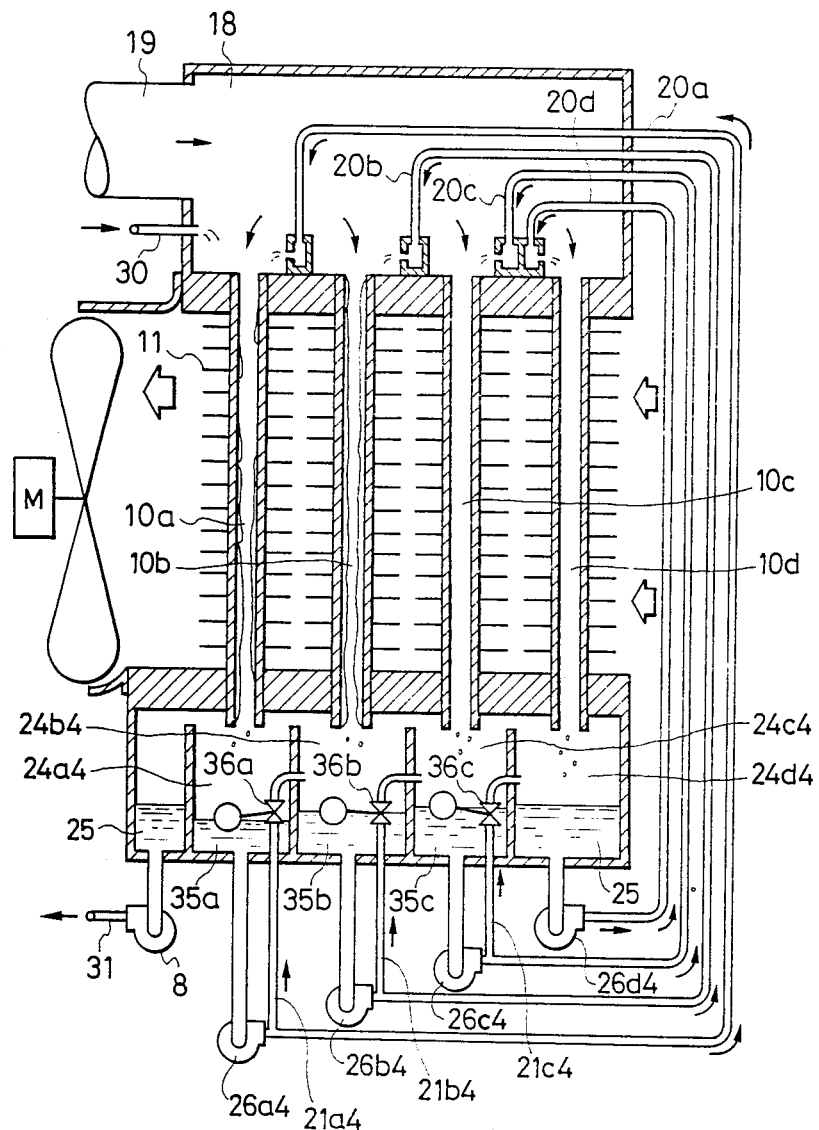
FIG. 5 is a schematic diagram surrounding an air-cooled absorber and an air-cooled condenser showing another embodiment of the present invention in which the receiving pan members are provided with another absorbent solution tank.

FIG. 5 shows another embodiment of the present invention. The receiving pan members 24a4, 24b4 and 24c4 of the first path, the second path and the third path are provided respectively with another absorbent solution tank 35a, 35b and 35c at a partial portion thereof. The absorbent solution tank 35a, 35b and 35c is provided respectively with a floating valve members 36a, 36b and 36c therein. The branch conduit 21a4, 21b4, 26c4 and 21d4 for separating the absorbent solution toward the next absorption process path is connected respectively to the discharge side of the absorbent solution spray pump 26a4, 26b4, 26c4 and 26d4. Each branch conduit 21a4, 21b4 and 26c4 is provided respectively with the floating valve members 26a, 36b and 36c on the middle portion thereof.

According to this embodiment of a present invention, the suction level of each absorbent solution spray pump 26a4, 26b4 and 26c4 is maintained respectively at a predetermined height through the separation flow amount adjusting function of the floating valve members 36a, 36b and 36c, therefore racing of each absorbent solution spray pump 26a4, 26b4 and 26c4 can be prevented.

Figure 6:
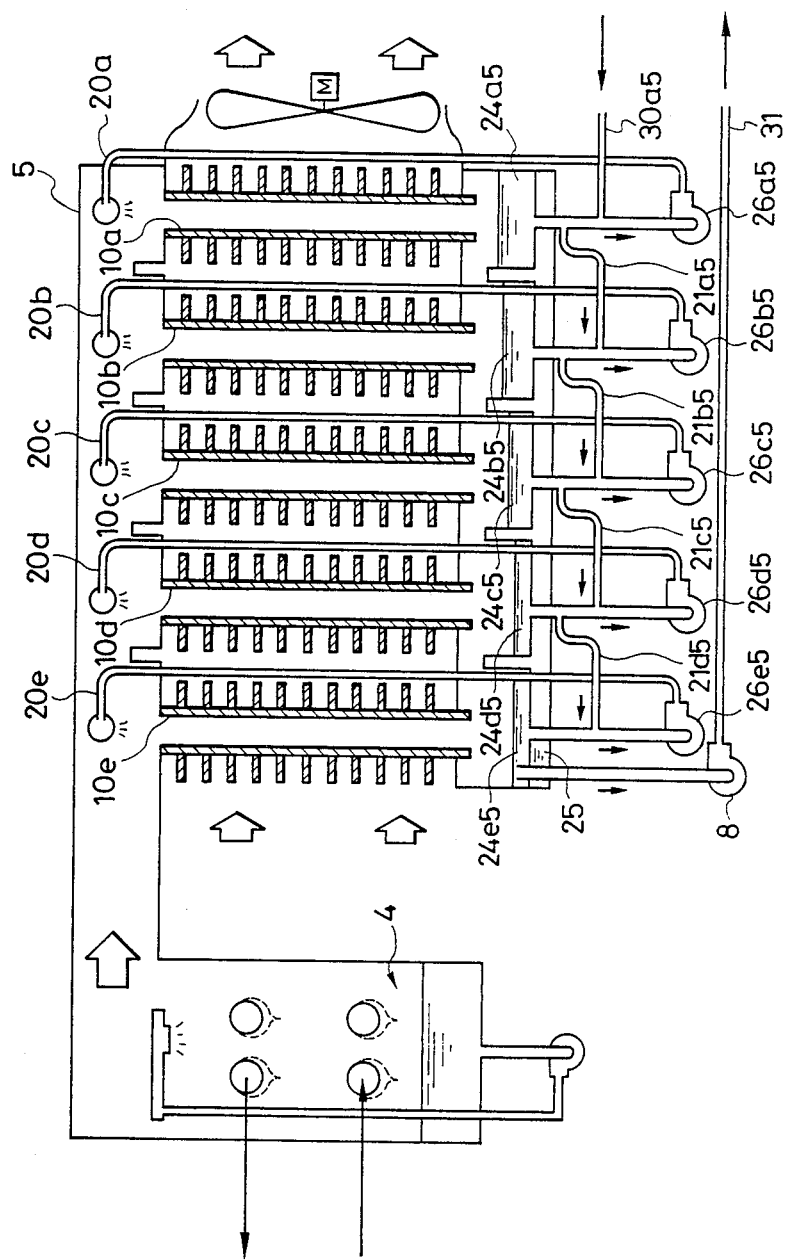
FIG. 6 is a schematic diagram surrounding an air-cooled absorber and an air-cooled condenser showing a further embodiment of the present invention in which the receiving pan members are provided with a branch conduit.

FIG. 6 shows another embodiment of the present invention. In FIG. 6, the branch conduit 21a5, 21b5, 21c5 and 21d5 for sending the absorbent solution in the receiving pan members 24a5, 24b5, 24c5 and 24d5 of the first path, the second path, the third path, and the fourth absorption process path to the next path is communicated respectively with the suction pipe side of the absorbent solution spray pump 26a5, 26b5, 26c5, 26d5 and 26e5. The strong solution for the first absorption process path is led into the receiving pan members 24a5 from the low temperature stage heat exchanger 7 through an absorbent solution conduit 30a5.

The absorbent solution in the receiving pan members 24a5 of the first absorption process path is mixed with the absorbent solution in the receiving pan members 24b5 of the second absorption process path through the branch conduit 21a5. The absorbent solution in the receiving pan members 24b5 of the second absorption process path is mixed with the absorbent solution in the receiving pan members 24c5 of the third absorption process path through the branch conduit 21b5. The absorbent solution in the receiving pan members 24c5 of the third absorption process path is mixed with the absorbent solution in the receiving pan members 24d5 of the fourth absorption process path through the branch conduit 21c5. The absorbent solution in the receiving pan members 24d5 of the fourth absorption process path is mixed with the absorbent solution in the receiving pan members 24e5 of the fifth absorption process path through the branch conduit 21d5.

According to this embodiment of the present invention, the absorbent solution having a little high concentration level in the receiving pan members 24a5, 24b5, 24c5, 24d5 and 24e5 of the preceding absorption process path is mixed with the absorbent solution of the next absorption process, which is sucked in each absorbent solution spray pump 26b5, 26c5, 26d5 and 26e5. The concentration level of the absorbent solution being sprayed is set higher than the preceding absorbent solution being mixed into the receiving pan members 24b5, 24c5, 24d5 and 24e5. The absorbent solution having high absorption ability is sprayed into the next absorption process path, so that each absorption process path operation can be carried out effectively, and therefore the absorbent solution having a still lower concentration level can be obtained therefrom.

Figure 7:
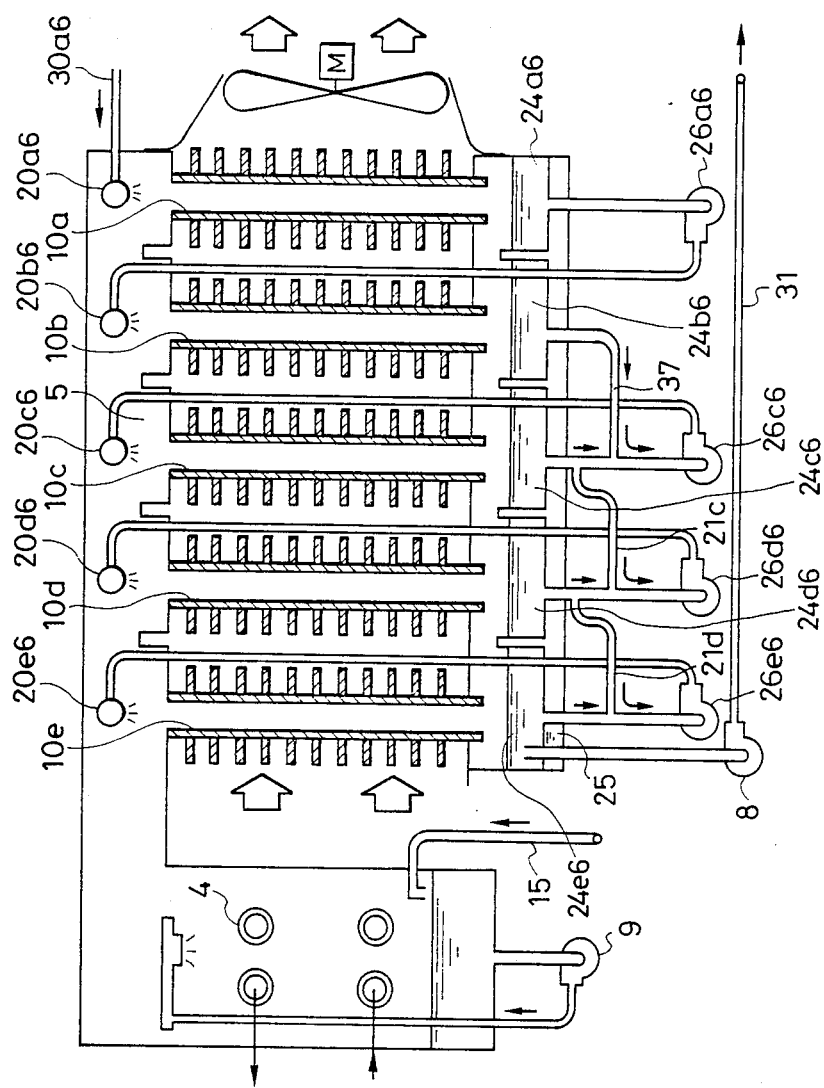
FIG. 7 is a schematic diagram surrounding an air-cooled absorber and an air-cooled condenser showing another embodiment of the present invention in which the preceding absorbent solution is mixed into the next receiving pan members.

FIG. 7 shows another embodiment of the present invention. The discharge side of the absorbent solution spray pump 26a6 of the first absorption process path is connected to the absorbent solution spray apparatus 20b6, which is provided on the upper portion of the second vertical tube group 10b of the second absorption process path. The receiving pan members 24b6 of the second absorption process path are connected to the suction side of the absorbent solution spray pump 26c6 of the third absorption process path through the absorbent solution conduit 37. The absorbent solution spray apparatus 20a6, which is disposed at the upper portion of the first vertical ftube group 10a of the first absorption process path, is connected to the low temperature stage heat exchanger 7 through the absorbent solution conduit 30a6.

The absorbent solution in the receiving pan members 24a6 of the first absorption process path is sprayed into the second vertical tube group 10b of the second absorption process path through the absorbent solution spray apparatus 20a6. The absorbent solution in the receive pan members 24b6 of the second absorption process path is sprayed into the third vertical tube group 10c of the third absorption process path through the absorbent solution spray apparatus 20c6. The absorbent solution in the receiving pan members 24c6 of the third absorption process path is sprayed into the fourth vertical tube group 10d of the fourth absorption process path through the absorbent solution spray apparatus 20d6. The absorbent solution in the receiving pan members 24d of the fourth absorption process path is sprayed into the fifth vertical tube group 10e of the fifth absorption process path through the absorbent solution spray apparatus 20e6.

The absorbent solution flows in both the first absorption process path and the second path absorption process in a series flow. However the absorbent solution flows may form a series flow in any absorption process path, for example, the third or the fourth path absorption process.

The absorbent solution is not recirculated in the first absorption process path. The absorbent solution flows in series from the first path absorption process to the second absorption process path. Each absorbent solution in the second path, the third path and the fourth paths flows down into the next absorption process path and is not recirculated in same absorption process path.

Figure 8:
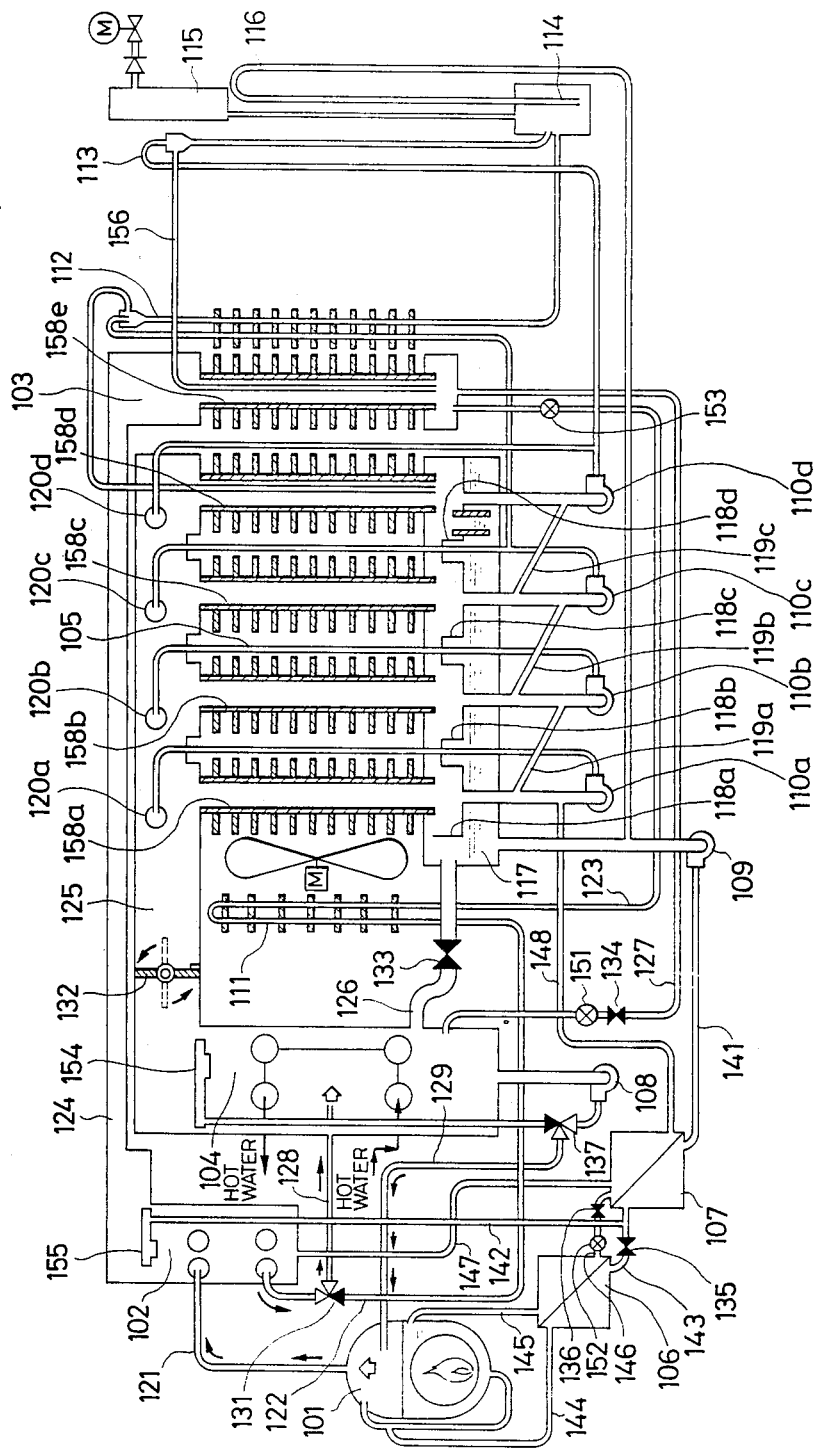
FIG. 8 is a schematic flow diagram, partially in cross section, of an air-cooled absorption heating and cooling system in accordance with the one embodiment of the present invention showing the heating mode of operation.

The heating mode of operation for the air-cooled absorption heating and cooling system according to one embodiment of the present invention will now be described with reference to FIG. 8.

The air-cooled absorption heating and cooling system includes a high temperature stage regenerator 101, a low temperature stage regenerator 102, an air-cooled condenser 103, an evaporator 104, an air-cooled vertical tubes absorber 105, a high temperature stage heat exchanger 106, a low temperature stage heat exchanger 107, a liquid refrigerant pump 108, an absorbent solution circulation pump 109, and a precooler 111. The system includes further an air automatic extraction apparatus 112 for the air-cooled absorber 105, an automatic air extraction apparatus 113 for the air-cooled condenser 103, a vapor-liquid separator 114, an air tank 115, and a reverse U letter shaped sealing tube 116.

The air-cooled absorber 105 comprises five lines, that is, the first, the second, the third, the fourth, and the fifth vertical tube group 158a, 158b, 158c, 158d and 158e. Each line of the vertical tube group 158a, 158b, 158c, 158d and 158e forms one path absorption process path, respectively. An absorbent solution receiving pan members 118a, 118b, 118c, and 118d is provided respectively below each vertical tube group 158a, 158b, 158c and 158d. These receiving pan members 118a, 118b, 118c and 118d are positioned within a diluted solution tank 117. Each receiving pan members 118a, 118b, 118c and 118d is communicated respectively with an absorbent solution spray pump 110a, 110b, 110c and 110d.

A communicating tube 119a, 119b and 119c is communicated with the absorbent solution spray pump 110a, 110b, 110c and 110d adjacent each other. The absorbent solution in each receiving pan member 118a, 118*b*, 118*c* and 118*d* is sprayed respectively into each path absorption process by means of absorbent solution spray members 120*a*, 120*b*, 120*c* and 120*d*.

The high temperature stage regenerator 101 and the low temperature stage regenerator 102 are communicated with a refrigerant conduit 121. The low temperature stage regenerator 102 and the precooler 111 are communicated with a refrigerant conduit 122. The refrigerant conduit 122 is provided with a three-way change-over valve 131 on the middle portion thereof so as to send the refrigerant vapor from the high temperature stage regenerator 101 into the evaporator 104. The three-way change-over valve 131 and the evaporator 104 are connected to a steam conduit 128.

The evaporator 104 and the air-cooled absorber 105 are communicated with a steam conduit 125. The steam conduit 125 is provided with a change-over valve 132 therein. The evaporator 104 and the absorbent solution tank 117 are communicated with an overflow steam conduit 126. The overflow steam conduit 126 is provided with a change-over valve 133 therein. The evaporator 104 and the air-cooled condenser 103 are communicated with a liquid refrigerant conduit 127. The liquid refrigerant conduit 127 is provided with a change-over valve 134 therein.

The high temperature stage heat exchanger 106 and the low temperature stage heat exchanger 107 are communicated with an absorbent solution liquid introduction conduit 143. The absorbent solution liquid introduction conduit 143 is provided with a change-over valve 135 therein. The high temperature stage heat exchanger 106 and the low temperature stage heat exchanger 107 are communicated with an absorbent solution return conduit 146. The absorbent solution return conduit 146 is provided with a change-over valve 136 therein.

A three-way change-over valve 137 is provided between the evaporator 104 and the high temperature stage regenerator 101 so as to send the liquid refrigerant into the high temperature stage regenerator 101 from the evaporator 104. The precooler 111 and the air-cooled condenser 103 are communicated with a conduit 123. The low temperature stage regenerator 102 and the air-cooled condenser 103 are communicated with a conduit 124.

The low temperature stage heat exchanger 107 and the absorbent solution circulation pump 109 are communicated with a conduit 141. A conduit 142 is provided with a spray members 155 at the top portion thereof. The high temperature stage regenerator 101 and the high temperature stage heat exchanger 106 are communicated with a conduit 144 and a conduit 145. The low temperature stage regenerator 102 and the low temperature stage heat exchanger 107 are communicated with a conduit 147. The low temperature stage heat exchanger 107 and the receiving pan members 118*a* are communicated with a conduit 148.

Each of the pressure reducing members 151, 152 and 153 is provided with the liquid refrigerant conduit 127, the conduit 146, and the conduit 123, respectively. Refrigerant spray members 154 are provided in the evaporator 104 so as to spray the refrigerant. The air automatic extracting apparatus 112 and the automatic air extracting apparatus 113 connect respectively an air extracting tube 157 and an air extracting tube 156. The liquid refrigerant pump 108 sends the liquid refrigerant into the high temperature stage regenerator 101 from the evaporator 104.

The heating mode of operation in the system is carried out with following method. The coming and going of the absorbent solution into and from the high temperature stage regenerator 101 are set up at shut-off condition. The generated refrigerant vapor is led into the evaporator 104. The liquid refrigerant in the evaporator 104 is returned into the high temperature stage regenerator 101 through a conduit 129 by means of the liquid refrigerant pump 108.

The change-over valve 131 lead the refrigerant vapor generated in the high temperature stage regenerator 101 into the evaporator 104 through the steam conduit 128 and is changed over so as to shut-off the refrigerant flow into the precooler 111 and the air-cooled condenser 103. Each change-over valve 132, 133, 134, 135 and 136 shuts off the respective passage.

The three-way change-over valve 137 provided on the discharge side of the liquid refrigerant pump 108 prevents the liquid refrigerant from being sent into the refrigerant spray members 154 of the evaporator 104 and is changed over so as to send the liquid refrigerant into the high temperature stage regenerator 101 through the conduit 129. Each of a fan, the absorbent solution circulation pump 109 and the absorbent solution spray pump 110*a*, 110*b*, 110*c* and 110*d* remains at rest.

When the high temperature stage regenerator 101 is heated with an outside source of heat, the absorbent solution in the high temperature stage regenerator 101 is heated with generation of the refrigerant vapor. The generated refrigerant vapor is led into the evaporator 104 through the refrigerant conduit 121, the heat exchanger tube of the low temperature stage regenerator 102 and the three-way change-over valve 131 and the conduit 128.

The refrigerant vapor is cooled through heat exchange with the hot water, which flows in the heat exchanger tube of the evaporator 104, and then liquefied by condensation. The liquid refrigerant in the evaporator 104 returns into the high temperature stage regenerator 101 by means of the liquid refrigerant pump 108 through the three-way change-over valve 137 and the conduit 129.

The heating mode cycle operates as described above, so the refrigerant vapor is prevented from flowing into the air-cooled absorber 105 and the air-cooled condenser 103, therefore heat dissipation into the ambient atmosphere is not brought about in this system.

According to above the embodiment of the present invention, during the heating mode of operation, the refrigerant vapor generated the high temperature stage regenerator 101 is led into the evaporator 104 through the three-way change-over valve 131 and the conduit 128 and heats the hot water which flows into the heat exchanger tube of the evaporator 104. The evaporator 104 is interrupted with the air-cooled absorber 105 by the change-over valve 132 and the change-over valve 133, and thereby the refrigerant vapor is checked from flowing into the air-cooled absorber 105.

The air-cooled condenser 103 is interrupted with the evaporator 104 by the change-over valve 134. The air-cooled condenser 103 is interrupted with the high temperature stage regenerator 101 by the three-way change-over valve 131. The air-cooled absorber 105 is interrupted with the high temperature stage regenerator 101 by the change-over valve 135 and the change-over valve 136. The air-cooled absorber 103 is interrupted thermally with the low temperature stage regenerator 102 due to the discharge of the absorbent solution in the low temperature stage regenerator 102.

Therefore, heat energy of the combustion gas, which is supplied into the high temperature stage regenerator 101, is transferred to the hot water, which flows into the heat exchanger tube of the evaporator 104, and no heat dissipation into the ambient atmosphere from the air-cooled absorber 105 and the air-cooled condenser 103 occurs in this system.

The low temperature stage regenerator 102 is positioned higher than the diluted absorbent solution tank 117. No absorbent solution stays in the low temperature stage regenerator 102, and even if the refrigerant vapor having high temperature value flows into the heat exchanger tube of the low temperature stage regenerator 102, the refrigerant vapor is not generated therein.

No heat dissipation occurs in the air-cooled condenser 103 because the refrigerant vapor in the low temperature stage regenerator 102 does not flow into the air-cooled condenser 103. When the change-over valve 134, which is disposed on the liquid refrigerant conduit 127 for connecting the evaporator 104 with the air-cooled condenser 103, is shut off, the refrigerant vapor from the evaporator 104 is prevented from flowing into the air-cooled condenser 103. When the change-over valve 132 and the change-over valve 133, which are disposed respectively in the steam conduit 125 and the steam conduit 126 for connecting the air-cooled absorber 105 with the evaporator 104, are shut off, the refrigerant vapor from the evaporator 104 is prevented from flowing into the air-cooled absorber 105.

The noncondensing gas, during warming up operation, is extracted by the air-cooled condenser 103 having low pressure value according to the suitable opening degree of the change-over valve 134.

Figure 9:
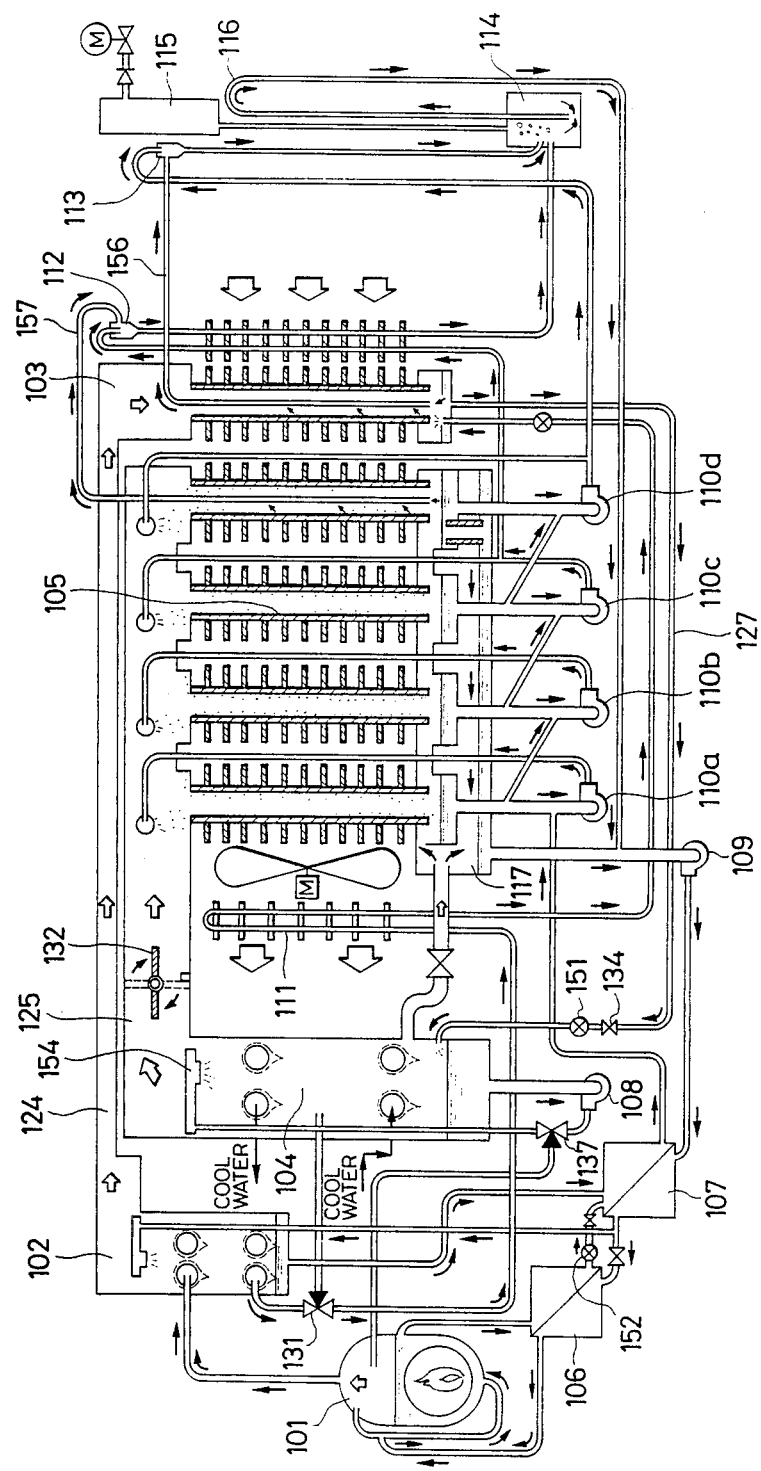
FIG. 9 is a schematic flow diagram, partially in cross section, of an air-cooled absorption heating and cooling system in accordance with embodiment of FIG. 8 showing the cooling mode of operation.

In this embodiment of the present invention, the low temperature stage regenerator 102 has the spray members 155 therein. By adoption of such a spray method utilizing the spray members 155, during the heating mode of operation, no absorbent solution in the low temperature stage regenerator 102 exists on the heat exchanger tube of the low temperature stage regenerator 102, so that the refrigerant vapor from the low temperature stage regenerator 102 can be prevented from being generated therein. It is unnecessary to provide a change-over valve on the steam conduit 134 for connecting the low temperature stage regenerator 102 with the air-cooled condenser 103. The cooling mode of operation for the air-cooled absorption heating and cooling system according to one embodiment of the present invention will now be described with reference to FIG. 9.

In case of the cooling cycle, the three-way change-over valve 131 is changed over so as to lead the refrigerant, which is heat-exchanged in the low temperature stage regenerator 102, into the air-cooled condenser 103 through the refrigerant conduit 122, the precooler 111 and the conduit 123. All of the change-over valves 132, 133, 134, 135 and 136 are opened at opening conditions. The three-way change-over valve 137 is changed over so as to supply the liquid refrigerant into the refrigerant spray members 154 of the evaporator 104. The fan, the absorbent solution circulation pump 109, the absorbent solution spray pump 110a, 110b, 110c and 110d, and the burner within the high temperature stage regenerator 101 are set respectively to be in motion condition.

The absorbent solution in the high temperature stage regenerator 101 is heated with generation of the refrigerant vapor by the combustion gas of the burner and then condensed. The generated refrigerant vapor is led into the heat exchanger tube of the low temperature stage regenerator 102 and heats the absorbent solution, which flows down to the outside surface of the heat exchanger tube of the low temperature stage regenerator 102, with generation of the refrigerant vapor.

The refrigerant vapor is condensed with the absorbent solution and then liquefied. The liquefied refrigerant is cooled by the cooling air in the precooler 111 through the three-way change-over valve 131 and the refrigerant conduit 122, and is led into the air-cooled condenser 103. The refrigerant vapor generated the low temperature stage regenerator 102 is led into the air-cooled condenser 103 through the refrigerant conduit 122 and then liquefied by condensation through cooling by cooling air.

The noncondensing gas in the system is sucked with the absorbent solution flow through the air extracting tube 156 by means of the automatic air extracting apparatus 113. The noncondensing gas is led into the liquid-vapor separator 114 and further stored in the air tank 115 under a comparatively high pressure value condition.

The liquid refrigerant generated in the air-cooled condenser 103 is led into the evaporator 104 through the liquid refrigerant conduit 127, the change-over valve 134 and the pressure reducing members 151. The liquid refrigerant generated in the evaporator 104 is sprayed over the heat exchanger tube of the evaporator 104 by means of the liquid refrigerant pump 108 through the three-way change-over valve 137 and the refrigerant spray members 154.

The liquid refrigerant is evaporated with heat exchange through the cool water, which flows into the heat exchanger tube of the evaporator 104, and led to the upper portion of the air-cooled absorber 105 through the steam conduit 125 and the change-over valve 132. The absorbent solution in the receiving pan members 118a, 118b, 118c and 118d is sprayed respectively into the vertical tube group 158a, 158b, 158c and 158d, which comprises respectively the first path, the second path, the third path and the fourth absorption process path, though the absorbent solution spray members 120a, 120b, 120c and 120d. The refrigerant vapor is absorbed in respective absorption process path.

The strong solution generated in the high temperature stage regenerator 101 is confluenced with the strong solution generated in the low temperature stage regenerator 102 through the high temperature stage heat exchanger 106 and the pressure reducing members 152. The confluenced dense absorbent solution is sucked through the low temperature stage heat exchanger 107 by the absorbent solution spray pump 110a and flows down in turn the vertical tube group 158a, 158b, 158c, 158d and 158e of the air-cooled absorber 105. The absorption heat in absorbing the refrigerant vapor by the absorbent solution is cooled through the cooling air.

According to this embodiment of the present invention, the refrigerant vapor is supplied into the diluted absorbent solution tank 117 from the evaporator 104 and also the refrigerant vapor is supplied from the bottom portions of the vertical tubes groups 158a, 158b, 158c and 158d, so that the refrigerant vapor for the air-cooled absorber 105 is supplied fully and the more diluted absorbent solution can be generated therefrom.

During the start operation, the overflow steam conduit 126 is filled up with the diluted absorbent solution, so that the refrigerant vapor is supplied entirely into the top portions of the vertical tube group 158a, 158b, 158c and 158d. The noncondensing gas in the system is collected at the bottom portions of the vertical tube group 158a, 158b, 158c and 158d of the air-cooled absorber 105, so that the air extracting tube 157, which is disposed at the bottom portions of the air-cooled absorber 105, can extract effectively the noncondensing gas.

We claim:

1. An air-cooled absorption heating and cooling system comprising:
   a regenerator means for boiling absorbent solution to condense the absorbent solution;
   an air-cooled condenser means for condensing refrigerant vapor generated in said regenerator means;
   an evaporator means for evaporating refrigerant condensed in said air-cooled condenser means to provide cooling;
   an air-cooled absorber means for absorbing refrigerant vapor from said means into an absorbent solution contentrated in said regenerator means;
   a heat exchanger means for heat-absorbing heat exchange refrigerant vapor generated in said regenerator means;
   said air-cooled absorber means including a plurality of substantially vertical tube groups, plural absorbent solution receiving means for receiving the absorbent solution, disposed below each vertical tube group along a cooling air flow direction, and an absorbent solution supply means for supplying the absorbent solution in said absorbent solution receiving means to said vertical tube group;
   plural absorption process paths defined by said vertical tube group and said absorbent solution receiving means; and
   a passage for flowing absorbent solution is located so as to lead the absorbent solution in at least one of said heat exchanger means and said absorbent solution receiving means from a cooling air down stream side of an absorption process path to a cooling air upper stream side of the same path.

2. An air-cooled absorption heating and cooling system according to claim 1, wherein
   a first path absorbent solution flow passage is formed so as to lead the absorbent solution in at least one of said heat exchanger means and said absorbent solution receiving means disposed below a first of the absorption process paths into a cooling air upper stream side of the first absorption process path through an absorbent solution conduit.

3. An air-cooled absorption heating and cooling system according to claim 2, wherein
   a subsequent path absorbent solution flow passage is located so as to lead the absorbent solution in said absorbent solution receiving means disposed below a subsequent one of the absorption process paths into a cooling air upper stream side of the same subsequent absorption process path.

4. An air-cooled absorption heating and cooling system according to claim 3, wherein
   each subsequent path absorbent solution flow passage is formed so as to lead the absorbent solution in said absorbent solution receiving means disposed below each of the subsequent absorption process paths into the cooling air upper stream side of the same subsequent absorption process paths.

5. An air-cooled absorption heating and cooling system according to claim 1, wherein
   said absorbent solution receiving means comprises plural receiving pan members disposed at the down stream side of each absorption process path, and the absorbent solution in each of the receiving pan members is sprayed respectively into an associated absorption process path.

6. An air-cooled absorption heating and cooling system according to claim 1, wherein
   said absorbent solution receiving means comprises plural receiving pan members being disposed at the down stream side of each absorption process path, the absorbent solution in each of the receiving pan members is sprayed respectively into an associated absorption process path, and the absorbent solution in each of the receiving pan members is sprayed respectively into a next absorption process path.

7. An air-cooled absorption heating and cooling system according to claim 1, wherein
   said absorbent solution receiving means comprises plural receiving pan members disposed at the down stream side of each absorption process path, and the absorbent solution in each of the receiving pan members is sprayed respectively into a subsequent absorption process path.

8. An air-cooled heating and cooling system according to claim 1, wherein
   said absorbent solution receiving means comprises plural receiving pan members disposed at the down stream side of each absorption process path, and a partial portion of each of the receiving pan members is extended toward a preceding absorption process path.

9. An air-cooled absorption heating and cooling system according to claim 1, wherein
   said absorbent solution receiving means comprises plural receiving pan members disposed at the down stream side of each absorption process path, and said receiving pan members provide, respectively dam members at the down stream side thereof.

10. An air-cooled absorption heating and cooling system according to claim 1, wherein
    said absorbent solution receiving means comprises plural receiving pan members disposed at the down stream side of each absorption process path, and said receiving pan members provide absorbent solution tank members respectively, and floating valve members therein.

11. An air-cooled absorption heating and cooling system according to claim 1, wherein
    said absorbent solution receiving means comprises plural receiving pan members disposed at the down stream side of each absorption process path, and branch pipe members communicate with said receiving pan members adjacent each other so as to send the absorbent solution in one absorption process path to a subsequent absorption process path.

12. An air-cooled absorption heating and cooling system according to claim 1, wherein
    said absorbent solution receiving means comprises plural receiving pan members disposed at the down stream side of each absorption process path, and said receiving pan members provide, respectively absorbent solution spray pump members so as to spray the absorbent solution in one absorption process path to a subsequent absorption process path.

13. An air-cooled absorption heating and cooling system comprising:

high temperature stage regenerator means for boiling absorbent solution to condense the absorbent solution;

low temperature state regenerator means for boiling absorbent solution to condense the absorbent solution;

air-cooled condenser means for condensing refrigerant vapor generated in said high temperature stage regenerator means and said low temperature stage regenerator means;

evaporator means for evaporating refrigerant condensed in said air-cooled condenser means to provide cooling;

air-cooled absorber means for absorbing refrigerant vapor in said evaporator means into an absorbent solution concentrated in said high temperature stage regenerator means and said low temperature stage regenerator means;

high temperature stage exchanger means for heat-absorbing heat exchange refrigerant vapor generated in said high temperature stage regenerator means;

low temperature stage exchanger means for heat-absorbing heat exchange refrigerant vapor generated in said low temperature stage regenerator means;

said air-cooled absorber means including a plurality of substantially vertical tube groups, plural absorbent solution receiving means for receiving the absorbent solution disposed below each vertical tube group along a cooling air flow direction, and absorbent solution supply means for supplying the absorbent solution in said absorbent solution receiving means to said vertical tube groups;

plural absorption processes paths defined by said vertical tube groups and said absorbent solution receiving means;

a passage for flowing absorbent solution located so as to lead the absorbent solution in at least one of said low temperature stage heat exchanger means and said absorbent solution receiving means from a cooling air down stream side of an absorption process path to a cooling air upper stream side of the same absorption process path;

first valve means provided on a refrigerant conduit being disposed between said high temperature stage refrigerator means and said air-cooled condenser means;

second valve pump provided on a steam conduit being disposed between said evaporator means and an upper portion of said air-cooled absorber means;

third valve means provided on a steam conduit being disposed between said evaporator means and a lower portion of said air-cooled absorber means;

fourth valve means provided on a liquid refrigerant conduit being disposed said air-cooled condenser means and said evaporator means;

fifth valve means provided on an absorbent solution introducing conduit being disposed between said high temperature stage regenerator means and said air-cooled absorber means;

sixth valve means provided on a refrigerant conduit being disposed said high temperature stage regenerator means and said air-cooled absorber means;

seventh valve means provided on a liquid refrigerant supply conduit being disposed between said evaporator means and said high temperature stage regenerator means; and liquid refrigerant pump means for sending a liquid refrigerant disposed on the liquid refrigerant supply conduit being disposed between said evaporator means and said high temperature stage regenerator means.

14. An air-cooled absorption heating and cooling system according to claim 13, wherein said first valve means is provided on the refrigerant conduit disposed between said low temperature stage regenerator means and said air-cooled condenser means, said third valve means is provided on the steam circuit disposed between said evaporator means and a diluted absorbent solution tank means of said air-cooled absorber means, said fifth valve means is provided on an absorbent solution introducing conduit disposed between said high temperature stage heat exchanger means and said low temperature stage heat exchanger means, said sixth valve means is provided on an absorbent solution return conduit, and said seventh valve means is provided on the conduit disposed between said high temperature stage regenerator means and said liquid refrigerant pump means.

15. An air-cooled absorption heating and cooling system according to claim 13, wherein during a heating mode of operation, said first valve means is operative to lead the refrigerant vapor generated said high temperature stage regenerator means into said evaporator means and is changed over so as to shut-off the refrigerant flow into said air-cooled condenser means each of said second valve means, said third valve means said fourth valve means, said fifth valve means and said sixth valve means is in a position to shut-off the respective conduits, and said seventh valve means is operative to prevent leading the liquid refrigerant into said evaporator means and is changed over so as to send the liquid refrigerant into said high temperature stage regenerator means.

16. An air-cooled absorption heating and cooling according to claim 13, wherein during a cooling mode of operation, said first valve means is operative so as to lead the refrigerant into said air-cooled condenser means, each of said second valve means, said third valve means, said fourth valve means, said fifth valve means and said sixth valve means is in an open position so as to be opening condition, and said seventh valve means is in a changed-over position so as to supply the liquid refrigerant into said evaporator means.

17. An air-cooled absorption heating and cooling system according to claim 1, wherein a passage for introducing a refrigerant vapor between adjacent absorption process paths is provided in a space between a lower portion of said absorbent solution supply means and an upper portion of said vertical tube groups.

18. An air-cooled absorption heating and cooling system according to claim 1, wherein a passage for introducing a refrigerant vapor from said evaporator means into adjacent absorption process paths is provided in a space between an upper portion of said absorbent solution supply means and a lower wall portion of an upper header.

19. An air-cooled absorption heating and cooling system according to claim 12, wherein said absorbent solution receiving means comprises plural receiving pan members disposed at the down stream side of each absorption process path, absorbent solution spray pump members for spraying the absorbent solution into subsequent absorption process paths, each of each receiving pan members and of said spray pump members communicate with pump suction duct members, and adjacent ones of said pump suction duct members are communicated by a pipe.

* * * * *